United States Patent [19]

Garvey et al.

[11] 4,280,920

[45] Jul. 28, 1981

[54] STABILIZED ALUMINOSILICATE SLURRIES

[75] Inventors: Michael J. Garvey, Wirral; Ian C. Griffiths, Liverpool, both of England

[73] Assignee: Lever Brothers Company, New York, N.Y.

[21] Appl. No.: 15,498

[22] Filed: Feb. 26, 1979

[30] Foreign Application Priority Data

Mar. 2, 1978 [GB] United Kingdom ............... 8373/78

[51] Int. Cl.$^3$ ..................... C11D 1/66; C11D 7/02
[52] U.S. Cl. ................... 252/173; 252/174.14; 252/174.21; 252/174.25; 252/DIG. 14
[58] Field of Search .......... 252/174.25, 135, 173, 252/179, DIG. 14, 174.14, 174.21

[56] References Cited

U.S. PATENT DOCUMENTS

| 3,962,116 | 6/1976 | Bloching et al. | 252/301.21 |
| 4,000,094 | 12/1976 | Fleming et al. | 252/557 |
| 4,072,622 | 2/1978 | Kühling et al. | 252/179 |
| 4,126,574 | 11/1978 | Reinwald et al. | 252/179 |
| 4,129,511 | 12/1978 | Ogoshi et al. | 252/140 |
| 4,179,393 | 12/1979 | Andree et al. | 252/155 |

FOREIGN PATENT DOCUMENTS

| 2538679 | 3/1976 | Fed. Rep. of Germany | 252/89 I |
| 2533615 | 4/1976 | Fed. Rep. of Germany | 252/89 I |
| 2702972 | 8/1977 | Fed. Rep. of Germany | 252/135 |
| 1429143 | 3/1976 | United Kingdom . | |
| 1464427 | 2/1977 | United Kingdom . | |

Primary Examiner—P. E. Willis, Jr.
Attorney, Agent, or Firm—Melvin H. Kurtz

[57] ABSTRACT

Suspensions of sodium aluminosilicate are stabilized by using 0.5-10% of a nonionic detergent active compound and 0.2-15% of a compatible water soluble salt. The stabilized suspensions can be used in the preparation of particulate detergent compositions by adding one or more other detergent ingredients and then drying the mixture.

12 Claims, No Drawings

STABILIZED ALUMINOSILICATE SLURRIES

It has been proposed to manufacture detergent compositions using sodium aluminosilicate ion-exchange materials as detergency builders, as described for example in U.K. patent specification Nos. 1,429,143, 1,473,201 and 1,473,202.

The sodium aluminosilicates have conventionally been used in powder form for other purposes, such as molecular sieves, although they are initially produced in aqueous suspension, normally by reaction between sodium aluminate and sodium silicate. However, as powdered detergent compositions are commonly produced by drying aqueous suspensions of the detergent ingredients, it was logical to use the aqueous suspensions of sodium aluminosilicate directly in the production of the detergent compositions, as described for example in U.K. patent specification No. 1,464,427.

In order to use sodium aluminosilicates in aqueous suspension for detergent powder production, it is necessary to stabilise the aqueous suspensions so that the sodium aluminosilicate does not settle out excessively during its storage or transport before its use. Untreated suspensions of sodium aluminosilicates normally settle out substantially, to produce a hard cake of the sodium aluminosilicate particles, which is difficult to redisperse into a uniform suspension. It has therefore been proposed to stabilise the suspensions by the addition of various materials, as described for example in UK patent specification No. 1,529,713. Unfortunately, the more effective suspension stabilising agents proposed hitherto tend to be expensive materials or they have to be used at relatively high levels, and it would clearly be desirable to be able to stabilise the sodium aluminosilicate suspensions by using useful detergent ingredients, so that no appreciable additional cost is incurred.

According to the present invention, a substantially stable aqueous suspension of a sodium aluminosilicate ion-exchange material comprises from about 25% to about 60% of sodium aluminosilicate, from about 0.5% to about 10% of a nonionic detergent active compound as described hereinbelow and from about 0.2% to about 15% by weight of a compatible water-soluble salt, all percentages being by weight of the aqueous suspension.

The invention includes a process for making a particulate detergent composition from the aqueous sodium aluminosilicate suspensions by the addition thereto of one or more other detergent ingredients, and then drying the resultant mixture, and detergent compositions so produced. The other ingredients which can be used in such compositions and the drying conditions usable in such processes are generally known per se, as described for example in the aforementioned UK patent specifications.

The aqueous suspensions according to the invention are preferably substantially stable during prolonged storage under a range of temperature conditions, ideally from about 0° C. to about 70° C., and all the essential ingredients should be acceptable for use in detergent compositions, so that they can replace ingredients which would otherwise have been added during detergent processing. It should be noted that the description of the suspensions as being substantially stable does not preclude a degree of separation of supernatant liquor, provided that the uniform suspension can be readily obtained again, eg by stirring.

The sodium aluminosilicate ion-exchange material which is used may be crystalline or amorphous, or a mixture thereof, and has the general formula:

$$0.8-1.5Na_2O.Al_2O_3.0.8-6SiO_2$$

These materials usually also contain some bound water and should have a calcium ion-exchange of at least 50 mg CaO/g. Preferred sodium aluminosilicates are amorphous materials with high calcium ion-exchange capacities having the nominal general formula $0.8-1.5Na_2O.Al_2O_3.2-3SiO_2$, and the crystalline sodium aluminosilicates known as zeolites A and X. The production and properties of these types of sodium aluminosilicates are described in the literature, including the UK patent specifications mentioned above.

The sodium aluminosilicates are normally initially produced in relatively dilute solution and then filtered, with or without washing. Fluidisation of the resultant filter cake by high shear milling, after the addition of water to reduce the solids content if necessary, produces the aqueous suspensions for further treatment according to the invention. Alternatively, the aqueous suspensions may be prepared from previously dried sodium aluminosilicate powder, especially when the sodium aluminosilicate is made a long way away from the place of its use to form the detergent compositions, and transport in powder form may be cheaper even allowing for the cost of drying. The aqueous suspensions preferably have a concentration of from about 30% to about 50%, for example about 35% to about 45% of anhydrous aluminosilicate, as higher concentrations tend to become too viscous for satisfactory use. In practice a maximum viscosity of about 50 poise appears acceptable at a low shear rate, ie less than about 50 $sec^{-1}$.

The nonionic detergent compounds used are the condensation products of reaction between ethylene oxide and a hydrophobic compound with a reactive hydrogen atom, especially the reaction products of aliphatic $C_{10}-C_{18}$ alcohols, or $C_8-C_{12}$ alkyl phenols with 6-20 moles of ethylene oxide. The nonionic compounds used are soluble in water at room temperature and have particularly effective detergent properties, and are therefore valued ingredients in detergent compositions, especially for fabric washing purposes. The nonionic compounds have high cloud points in excess of 55° C. in water and preferably in excess of about 80° C. in water, as determined in accordance with DIN 53917. By way of comparison, it may be noted that the nonionic surfactants proposed for stabilising sodium aluminosilicate suspensions in UK patent specification No. 1,529,713 were practically water-insoluble materials of low cloud point.

Because of their high water solubilities, the nonionic detergent compounds do not act alone as effective stabilisation agents for the aqueous suspensions of washed sodium aluminosilicate, but they appear to become effective when used at the appropriate concentration in conjunction with the salt which is also required to be used. The preferred nonionic detergent compounds are the condensation products of $C_{12}-C_{16}$ alkyl alcohols with about 7-11 moles of ethylene oxide, used at levels of about 1-5% by weight in the aqueous suspensions. It should be noted that the nonionic compounds used must, of course, be stable under highly alkaline conditions, as the sodium aluminosilicate suspensions are commonly above pH 10.

The salt used should normally be an alkali metal or ammonium salt, and is preferably an inorganic sodium salt with a polyvalent anion, which is of course compatible with other detergent ingredients, for example it should be stable under alkaline conditions and not highly coloured. The preferred salts are sodium sulphate and sodium carbonate, or mixtures thereof. Sodium silicate is also effective for suspension stabilising purposes, but appears to interact with sodium aluminosilicate to decrease its ion-exchange properties and preferably is used, if at all, at only low levels. The phosphate salts such as sodium orthophosphate, sodium pyrophosphate and sodium tripolyphosphate are also effective, but their presence increases the phosphorus content which is disadvantageous if the sodium aluminosilicate is used in order to decrease the phosphorus level for environmental reasons. Some organic salts, especially of low molecular weight aliphatic acids, such as sodium acetate, may alternatively be used.

Some inorganic salts, especially sodium silicate, may be present in the original sodium aluminosilicate suspension, for example as a surplus reactant from its production, in which case the amount thereof is to be included together with the added salt within the total salt content figures given above. Preferably the total amount of salt used is about 0.5% to about 10% by weight of the aqueous sodium aluminosilicate suspension.

The most effective levels of the nonionic detergent compound and the salt used as combined stabilising agents are readily found by simple experiment with the specific sodium aluminosilicate suspension to be stabilised. The optimum levels are, of course, those at which no hard caking of the sediment and minimum separation of supernatent liquor occur, a figure of at least 90% sediment volume after storage at room temperature (about 21° C.) for two weeks being generally preferred, but not essential provided that the sediment does not cake unduly and can be readily redispersed.

The invention is illustrated by the following Examples in which parts and percentages are by weight, except where otherwise indicated.

EXAMPLE 1

An aqueous suspension of amorphous sodium aluminosilicate was prepared by reaction between sodium aluminate and sodium silicate solutions followed by filtration and then washing with deionised water. The suspension contained about 39% anhydrous solids as determined by heating to 800° C. and about 1% soluble inorganic salt, and the sodium aluminosilicate had the approximate formula:

$$Na_2O.Al_2O_3.2.5SiO_2$$

and an average particle size of about 9 microns (by Coulter counter). After fluidisation by high shear milling in a PEK mixer, but without further treatment, this suspension settled readily into a hard cake of compact sediment which was difficult to homogenise.

To stabilise this suspension, a nonionic compound (27 g of $C_{14}$–$C_{15}$ alcohol—11 EO), was added in a molten state to 2 kg of the fluidised filter cake at a temperature of 45° C. and stirred for a few minutes. 17 g of sodium sulphate was then added in dry powder form and mixing continued for a few minutes for the salt to dissolve.

The resultant treated sodium aluminosilicate suspension was examined for stability during storage and for its rheological characteristics in a Haake Rotovisko viscometer. It was found that after a period of two weeks at about 20° C. there was negligible separation of supernatant liquor, with no signs of caking. The viscosity characteristics were also satisfactory, with the system being thixotropic and shear-thinning, with a viscosity of 8 poise at a shear rate of 50 sec$^{-1}$.

A similar procedure was repeated using sodium carbonate, sodium tripolyphosphate and sodium silicate instead of the sodium sulphate, also with good results.

EXAMPLE 2

An aqueous suspension was prepared to the following formulation:

| Ingredient | % |
| --- | --- |
| Sodium aluminosilicate (as in Example 1) (anhydrous basis) | 37.90 |
| Nonionic detergent compound (as in Example 1) | 2.40 |
| Sodium sulphate | 0.18 |
| Sodium carbonate | 0.22 |
| Water | 59.30 |
| | 100.00 |

This product was found to be thixotropic and stable under storage. The suspension was shear-thinning with a viscosity of 7.5, 3.6 and 2.4 poise at a temperature of 4.5° C., 24° C., and 69° C., respectively, at a shear rate of 50 sec$^{-1}$, and could be pumped readily at 10° C.

The aqueous suspension was found to be readily processable into a powdered detergent composition using conventional slurry making and spray drying processes. Specifically, the aqueous suspension was heated to 40° C. with mixing and then admixed with a slurry of other detergent ingredients at about 75° C., and then the resultant mixture which had a total solids concentration of about 52% was spray-dried in a counter-current tower with an air inlet temperature of 350° C. to give a free flowing powder. Sodium perborate was then added to the spray-dried base powder to give a final formulation as follows:

| Ingredients | % |
| --- | --- |
| Sodium alkyl benzene sulphonate | 7.0 |
| Nonionic detergent compound (as in Example 1) | 4.0 |
| Soap | 2.0 |
| Sodium tripolyphosphate | 18.00 |
| Sodium aluminosilicate (anhydrous) | 28.00 |
| Sodium carbonate | 3.00 |
| Sodium sulphate | 1.40 |
| Fluoroscers, stabilisers etc. | 2.40 |
| Water | 9.20 |
| Sodium perborate | 25.00 |

This detergent powder was found to have good detergent properties, without excessive deactivation of the detergenting building properties of the sodium aluminosilicate during spray-drying.

EXAMPLE 3

An aqueous suspension was prepared from powdered detergent grade crystalline sodium aluminosilicate (average particle size 4 microns by Coulter counter) by admixing all the ingredients at 35° C. as follows:

| Ingredient | % |
| --- | --- |
| Sodium aluminosilicate (zeolite 4A -anhydrous basis) | 38.60 |
| Nonionic detergent compound (as in Example 1) | 2.40 |
| Sodium sulphate | 0.44 |
| Sodium carbonate | 0.56 |
| Water | 58.00 |

This product was found to be stable during storage, giving no caking and being readily homogenised on stirring. The sediment volume after two days at 24° C. was 80%. Good results were also obtained when the salt content was increased to 1.73% sodium sulphate with 2.17% sodium carbonate (at 37.5% sodium aluminosilicate), and 2.13% sodium sulphate with 2.67% sodium carbonate (at 37.2% sodium aluminosilicate), with consequent adjustment of the water levels. Again, no caking was found and the sediment volumes on storage for two days at 24° C. were 91% and 96%, respectively. This aqueous suspension could be used to make a particulate detergent composition as described in Example 2.

EXAMPLES 4 TO 9

A series of aqueous suspensions of sodium aluminosilicate (zeolite A) were prepared by adding varying amounts of a nonionic detergent compound and salt to a 40% suspension of the powdered zeolite (anhydrous basis). The properties of the suspensions after vigorous sitrring and then standing for 64 hours at room temperature were noted, with the results in Table I below. All of the suspensions stabilised according to the invention had satisfactory properties and it was found that the sediments formed were readily redispersible.

TABLE 1

| Ingredient | Ex 4 | Ex 5 | Ex 6 | Ex 7 | Ex 8 | Ex 9 |
|---|---|---|---|---|---|---|
| Sodium aluminosilicate (Zeolite A) | 35.6 | 38.6 | 34.8 | 37.2 | 37.2 | 36.0 |
| Nonionic compound A[1] | 2.2 | 2.4 | 8.7 | 2.3 | 2.3 | — |
| Nonionic compound B[2] | — | — | — | — | — | 9.0 |
| Sodium acetate | 8.9 | 1.0 | 4.3 | — | — | — |
| Sodium sulphate + sodium carbonate (1.6:2) | — | — | — | — | — | 1.0 |
| Sodium tripolyphosphate | — | — | — | 4.7 | — | — |
| Sodium carboxymethyl-oxy-succinate | — | — | — | — | 4.7 | — |
| Water | | | | | | |
| Sediment volume (%) | 83.3 | 80.0 | 80.5 | 77.3 | 81.0 | 98.8 |
| Sediment condition | Soft, no caking | Little caking | Soft, no caking | Soft, no caking | Little caking | Soft, quick redispersion |

[1]As used in Example 1.
[2]$C_{13}$, $C_{15}$ alcohol - 12EO condensate

EXAMPLES 10 TO 15

The procedure of Examples 4 to 9 was repeated using suspensions of 32% or 48% zeolite (anhydrous basis) with the results shown in Table 2, and again good properties were obtained for the suspensions after storage.

TABLE 2

| Ingredient | Ex 10 | Ex 11 | Ex 12 | Ex 13 | Ex 14 | Ex 15 |
|---|---|---|---|---|---|---|
| Sodium aluminosilicate (zeolite A) | 28.8 | 28.8 | 29.8 | 43.2 | 44.7 | 43.2 |
| Nonionic compound A[1] | 9.0 | — | 2.3 | 9.0 | 2.3 | — |
| Nonionic compound C[2] | — | 9.0 | — | — | — | 9.0 |
| Sodium sulphate + sodium carbonate (1.6:2) | 0.9 | 0.9 | 4.6 | 0.9 | 4.6 | 0.9 |
| Water | 61.3 | 61.3 | 63.3 | 46.9 | 48.4 | 46.9 |
| Sediment volume (%) | 69.4 | 64.0 | 71.4 | 90.6 | 100.0 | 98.0 |
| Sediment condition | soft, little caking | soft, no caking | soft, no caking | soft | no caking | soft, little caking |

[1]As used in Example 1.
[2]$C_{12}$-$C_{15}$ alcohol - 12EO condensate.

EXAMPLES 16 TO 18

The procedure of Examples 4 to 9 was repeated except that a suspension of an amorphous sodium aluminosilicate was used, as in Example 1. The amounts and type of additives used and the properties of the resultant stabilised suspensions were as shown in Table 3 below.

TABLE 3

| Ingredient | Ex 16 | Ex 17 | Ex 18 |
|---|---|---|---|
| Sodium aluminosilicate (amorphous) | 32.8 | 31.1 | 30.8 |
| Nonionic compound A[1] | 1.9 | 7.1 | — |
| Nonionic compound C[1] | — | — | 1.8 |
| Sodium sulphate + sodium carbonate (1.6:2) | 0.8 | 0.7 | 7.0 |
| Water 64.5 | 61.0 | 60.4 | |
| Sediment volume (%) | 89.6 | 89.5 | 93.9 |
| Sediment condition | soft, little | soft, no caking | soft, little |

TABLE 3-continued

| | (% by weight) | | |
|---|---|---|---|
| Ingredient | Ex 16 | Ex 17 | Ex 18 |
| | | caking | caking |

[1] As in Table 2.

We claim:

1. A substantially stable aqueous suspension of a sodium aluminosilicate ion-exchange material which comprises from about 35% to about 50% of the sodium aluminosilicate (anhydrous basis) from about 0.5% to about 10% of a water-soluble nonionic detergent active compound having a cloud point in excess of about 55° C. as determined in accordance with DIN 53917 and from about 0.2% to about 15% of a compatible water-soluble salt, all percentages being by weight of the aqueous suspension, said suspension having a maximum viscosity of less than about 50 poise at a low shear rate.

2. An aqueous suspension according to claim 1, wherein the sodium aluminosilicate is zeolite A or zeolite X or a mixture thereof.

3. An aqueous suspension according to claim 1, wherein the sodium aluminosilicate is an amorphous material having the nominal general formula $0.8-1.5Na_2O.Al_2O_3.2-3SiO_2$.

4. An aqueous suspension according to claim 1, wherein the amount of sodium aluminosilicate is from about 35% to about 45% by weight of the suspension.

5. An aqueous suspension according to claim 1, wherein the nonionic detergent compound is the condensation product of $C_{12}-C_{16}$ alkyl alcohol with about 7-11 moles of ethylene oxide.

6. An aqueous suspension according to claim 1, wherein the amount of nonionic detergent compound is from about 1% to about 5% by weight of the suspension.

7. An aqueous suspension according to claim 1, wherein the salt is a sodium salt.

8. An aqueous suspension according to claim 1, wherein the salt has a polyvalent anion.

9. An aqueous suspension according to any one of the preceding claims, wherein the salt is sodium sulphate or sodium carbonate or a mixture thereof.

10. An aqueous suspension according to claim 1, wherein the amount of the salt is from about 0.5% to about 10% by weight of the suspension.

11. A process for the production of a particulate detergent composition from an aqueous suspension of sodium aluminosilicate according to claim 1 by adding thereto one or more other detergent ingredients and then drying the resultant mixture.

12. A particulate detergent composition made by a process according to claim 11.

* * * * *